United States Patent [19]  [11] 3,872,040
Mollohan et al. [45] Mar. 18, 1975

[54] WAX-CONTAINING POWDER COATINGS

[75] Inventors: Kenneth L. Mollohan, Freeport; Joseph M. Makhlouf, Mars, both of Pa.

[73] Assignee: PPG Industries, Inc., Pittsburgh, Pa.

[22] Filed: Oct. 2, 1972

[21] Appl. No.: 294,046

[52] U.S. Cl.............. 260/21, 117/21, 117/132 BE, 117/132 BF, 117/132 R, 117/161 LN, 117/161 ZB, 260/22 R, 260/23 AR, 260/28, 260/32.6 R, 260/32.6 N, 260/32.8 EP, 260/32.8 R, 260/32.8 N
[51] Int. Cl. ....... C09d 3/58, C09d 3/60, C09d 3/66
[58] Field of Search ................... 260/21, 28; 117/21

[56] References Cited
UNITED STATES PATENTS

| | | | |
|---|---|---|---|
| 3,138,483 | 6/1964 | Dettling et al. | 117/21 |
| 3,211,695 | 10/1965 | Peterson | 117/21 |
| 3,557,691 | 1/1971 | Bayer | 117/21 |
| 3,576,775 | 4/1971 | Jaegersberg | 260/28 |
| 3,583,935 | 6/1971 | Weissermel et al. | 260/28 |
| 3,594,450 | 7/1971 | Herwig et al. | 260/28 |
| 3,624,232 | 11/1971 | Van Dorp | 117/21 |
| 3,627,568 | 12/1971 | Padgett | 117/21 |
| 3,666,519 | 5/1972 | Bayer | 117/21 |
| 3,756,981 | 9/1973 | Breitschaft | 260/28 |
| 3,759,854 | 9/1973 | Chang et al. | 260/21 |

*Primary Examiner*—Ronald W. Griffin
*Attorney, Agent, or Firm*—Frank J. Troy; Carl T. Severini

[57] ABSTRACT

Powder coating compositions formulated to contain a minor proportion of a natural or synthetic wax provide for films having smooth surfaces which are substantially free of voids or entrapped gas pockets which generally appear at or near the surface of said films when they are fused. These powders can be coated onto substrates by techniques well known in the art such as fluidized bed, electrostatic fluidized bed, electrostatic spray, or the like to provide useful decorative and protective films.

15 Claims, No Drawings

3,872,040

WAX-CONTAINING POWDER COATINGS

BACKGROUND OF THE INVENTION

In recent years there have been extensive developments in the powder coatings art. For example, there have been many developments related to resin powder synthesis. See for example U.S. Pat. Nos. 3,555,111; 3,374,193; 3,458,595; 3,506,598; 3,617,358 and 3,624,232. Also there are numerous patents directed to methods of applying a powder substrate, such as U.S. Pat. Nos. 3,550,852; 3,558,052 and 3,598,626. These renewed efforts in the powder coating technology have been encouraged by Federal, state and local government anti-pollution statues. The control or elimination of air pollution is a prime target of many of the statutes. Air pollution is of particular importance to the coatings industry because many solvent emissions from conventional paint compositions are photochemically reactive and are thus subject to control. Therefore powder coating compositions which need not contain solvent are being investigated as a solution to such problems.

However, the use of powder coatings entails a number of unique problems. For example, when most commercially available powders are fused on a substrate and the films provided are above a certain thickness, there appears at or near the surface of the fused film, entrapped bubbles, pockets or voids which contain gases. These bubbles not only cause an unattractive loss of gloss, but also have a deleterious effect on the chemical and physical properties of the films.

DESCRIPTION OF THE INVENTION

It has now been discovered that films substantially free from void-induced loss of appearance and properties can be prepared from a resin powder coating composition which has incorporated therein a minor proportion of a natural or synthetic wax. More particularly, the invention herein is directed to a method of providing films which have substantially void-free surfaces from a resin powder coating composition by incorporating a minor proportion of a natural or synthetic wax into the resin powder composition and fusing the wax-containing resin powder composition on a substrate. These fused films generally have improved appearance, gloss, and chemical and physical properties.

The invention herein may employ any solid or semi-solid natural or synthetic wax. Natural waxes include paraffin wax, microcrystalline wax, other mineral waxes, vegetable waxes, and animal waxes. Examples of mineral waxes include Montan wax, lignite wax, oxocerite, ceresian, Utah wax, peat wax. Examples of vegetable wax include bayberry wax, candelilla wax, carnuba wax, cotton, esparto, fir, Japan, ouricury, palm, rice oil, sugar cane, ucuhuba, and cocoa butter. Examples of animal wax include beeswax. Chinese wax, shellac wax, spermaceti, and wool wax. Examples of synthetic waxes include those from fatty alcohols and acids such as cetyl alcohol, lanette wax, stearyl alcohol, stearic acid, palmitic acid, and myristic acid: fatty acid esters and glycerides such as glycerylstearic, glycol fatty-acids stearic, sorbitol stearics, and polyethylene glycol stearates: hydrogenated oils: ketones, amines and amides such as stearone, laurone, aliphatic amines and ali- waxes such as Fisher-Tropsche waxes and duroxon waxes: synthetic animal waxes such as synthetic beeswax, modified spermaceti waxes, and modified lanolin waxes: and other miscellaneous waxes such as oxazoline, experimental waxes and the like.

Paraffin wax may be defined as a purified mixture of solid hydrocarbons obtained from petroleum, which is a colorless or white, more or less translucent mass showing a crystalline structure, without odor or taste and is slightly greasy to the touch. Paraffin waxh has a melting point that varies from 110°–150°F. and appears commercially in many different grades with varying physical properties. Microcrystalline wax is different from refined paraffin waxes in the size and structure of the crystals and in that they are tougher and more flexible and have higher tensile strength in melting point. They are also more adhesive, less lustrous and greasy. The other mineral waxes described hereinabove are derived from coal in various stages of development, i.e., lignite, bitumens, peat. The principal components in montan wax comprise carbon, hydrogen, sulfur, and ash. Lignite wax consists of a mixture of ester wax with a resinous and asphaltic matter. It is brown, dark, hard, brittle and odorous and has a melting point of from about 69° to 84°C. True ozocerite wax is a bituminous product occurring in miocene formations near petroleum deposits and is commercially available in black, yellow and white colors. Its chemical composition is not definitely known, but it appears to be a mixture of solid, saturated, and unsaturated hydrocarbons of high molecular weight in which some hydrocarbon liquids and oxygenated bodies are present. Ceresin as originally found is a purified lucerite but it is usually mixed with paraffin wax to reduce cost and is sold commercially containing from 50 to about 80 percent paraffin wax and has a melting point of 130° to 175°F. Utah wax is an amorphous mineral wax which is available in a large number of grades that vary in hardness and melting points and color. Generally, it is slightly soluble in organic solvents when cold and has a melting point of about 73°C.

Peat waxes are dark brown or black and are hard and brittle and generally have a melting point that ranges from about 62° to 75°C. Bayberry wax, often called candleberry wax, is obtained from the berries of the shrub Myrica Cerifera or Carolinensis. Bayberry wax is a greenish-white fatty substance, more brittle than beeswax and has a melting point of 102°–120°F. Candelilla wax is a vegetable wax and is found in the form of scales entirely covering a reedlike plant (Euphorvia Antisithilatica) which grows wild and is in great abundance on the rocky slopes and plains of southwestern Mexico and southern Texas. This wax is hard, brittle, and has an aromatic odor and a melting point of 149°–156°F. Carnauba wax is extruded from the leaves of the Brazilian "Tree of Life" plant (Coprnica Cerisera). This wax is amorphous, hard, tough, and lustrous. It has a pleasant odor: it breaks with a clean fracture and has a melting point of 180°–187°F.

Cotton waxes are obtained from the so-called green cotton by solvent extraction. It is hard, yellow and has a melting point of 83°–86°F. Esparto wax is found as a coating on esparto grass which grows in southern Spain and north Africa. It is hard, brittle, non-tackey and brownish in color. It contains about 65–70 percent hydrocarbon of the formula $C_{31}H_{64}$ and has a melting point of 162°–165°F. Fir wax is primarily obtained in the corky fractions in the bark of the Douglas fir tree. It is hard, pleasant-smelling and has moderately high melting point of 162°–165°F. Japan wax is derived from the protective coatings on the berry kernels from several varieties of Japanese Sumac trees. This wax is a pale, cream color with a gummy feeling and has a melting point of 122°–133°F. Ouricury wax is extruded from the leaves of ouricury palm which grows in Brazil. This wax is very similar to carnauba in character; it is brown in color and has a melting point of 179°–183°F. Palm wax refers to the particular type of blends of true waxes which have been compounded for specific purposes. These waxes are available in a variety of grades and have a melting point of 82°–86°C. Rice oil wax is prepared commercially by hydrogenation of crude rice oil at high pressure and temperatures. These commercial rice waxes melt at a temperature of 67°–69°C. Crude cane waxes are a by-product in the manufacture of raw sugar and have a melting point of 165°–170°C. Ucuhuba wax is obtained from the ucuhuba plant which grows in Brazil. It has a yellowish color and has a melting point of 116°–120°F. Cocoa butter wax is a fatty material obtained from roasting cocoa beans and is principally a by-product of chocolate manufacture. It is yellowish-white, greasy solid or a faint but agreeable odor, chocolaty taste and has a melting point of 30°–35°C.

Beeswax is secreted by the honey bee for building its combs. Beeswax is amorphoid, varies in color from a deep brown to a light taffy shade and has a melting point of from about 64°–75°C. Chinese wax is deposited on the branch of a species of ash tree in China by certain insects. This wax is yellowish-white, fairly hard, shiny, fibrous, crystalline, and has a melting point of 149°–176°F. Shellac wax is a by-product in the production of alcoholic solutions of shellac. This wax is hard, tough, brown, lustrous and has a melting point of 74°–80°C. Spermaceti wax is obtained from the head cavities and the blubber of the sperm whale. This wax forms lustrous white masses of long, glistening white crystals and has a melting point of 113°–120°F. Crystals of this wax are quite brittle and can easily be powdered. Also, this wax is without taste or odor. Wool wax is often called wool fat or wool grease. It is extracted from the crude sheeps' wool. The wax is usually formed by centrifuging the wool which has been steeped in water and a detergent.

Cetyl alcohol is obtained by splitting sperm oil or spermaceti or by the reduction of cetyl palminate or palmitic acid. This wax is a tasteless, odorless product and has a melting point of 45°–50°C.

Stearyl alcohol is a white solid wax-like product: Mixture of fatty alcohols and stearyl alcohol predominating. This wax has a melting point of 54°–57°C.

Stearic acid is not a chemically pure compound but it is a mixture of fatty acids in which stearic acid predominates. This wax has a melting point of from about 52.8°C. to about 55.8°C.

Palmitic acid occurs naturally as a glyceride in various vegetable and animal fats and oils. It is a hard, crystalline substance which has a melting point of 58°–63°C. Myristic acid is found as a glyceride in vegetable oils and fats. It is hard, crystalline, ranging in color from white to light brown and has a melting point of about 53.8°C.

Glyceryl stearates are wax-like glyceryl esters of glyceryl tristearate, glyceryl distearate, and glyceryl monostearate. This material is a wax-like solid and has a melting point of 57°–61°C. Glyceryl fatty-acid stearates are essentially mono esters obtained from the reaction of one molecule of glycol with one molecule of fatty acid. These waxes have a melting point range from 67°–86°C. Sorbitol stearates consist chiefly of sorbitan and sorbide esters formed during esterification. Polyethylene glycol stearates are polymers which dissolve in water to form clear solutions; they do not hydrolyze or deteriorate. By blending several members of the series, many intermediate combinations having desired physical properties can be obtained. Certain solid, water soluble, polyethylene glycols which have a molecular weight greater than 500, have a waxy appearance and are sold under the trade name of Carbowaxes are also useful in the invention herein.

Hydrogenated oil waxes which are prepared by the hydrogenation of cottonseed, coconut, peanut, soybean, castor, fishwhale, or other vegetable, fish, or animal oils yield useful waxes herein. One of the highest melting commercial waxes is produced from castor oil and is preferred herein. Generally the melting point of these waxes range from about 44° to about 73°C. A preferred wax herein is castor wax which is a synthetic wax-like compound obtained by controlling the hydrogenation of pure castor oil. The principal constituent is the glyceride of 12-hydroxy stearic acid. Castor wax is a hard, brittle, high-melting point product that is practically odorless and tasteless. This wax has a melting point of 86°C. Castor wax is compatible with all insect waxes, natural vegetable waxes and Montan.

Stearone and laurone are symmetrical, aliphatic ketones derived from the corresponding fatty acids. Stearone has a melting point of 80°C. and laurone has a melting point of 65°C. Aliphatic amine waxes are sold under the trade name Acrawax (Glyco Chemicals, Inc.). These waxes are reaction products of hydrogenated castor oil and monoethanolamine. These waxes are hard, have a tan color, and a melting point of 94°–97°C. High molecular weight aliphatic amides provide for light, lemon-colored waxes that have a melting point of about 99°C. These wax amides are unstable above 170°C. and decompose to form equal molar proportions of the corresponding nitrile, fatty acid and ammonia. Chloronaphthalene waxes are produced by the chlorination of naphthalene and are both crystalline and amorphous. They occur in translucent black light and various other colors. Generally, these waxes melt in the range of 90°–95°C.

Synthetic mineral waxes have been prepared by passing carbon monoxide and hydrogen over alkalized iron turnings at a pressure of 100 atmospheres and a temperature of 400°C. The waxes provided usually have a melting point in excess of 105°C.

A synthetic beeswax is available commercially and in many instances may be employed as a suitable substitute for natural beeswax. Modified spermaceti waxes are sold under the trademark Carloate and are available from Robeco, Inc. Modified lanolin waxes are also available commercially. Various other miscellaneous and synthetic waxes may be employed herein.

The waxes described hereinabove may be used in combination with each other if desired. Generally, the wax is melted and added to the polymer before the powder is formed. In some instances wax emulsions or solutions that have been prepared are added to the resin composition before the powder particles are formed. For example, carnauba wax will form a solution in ether, boiling alcohol and alkalis; paraffin wax will form a solution in benzene, ligroin, warm alcohol, chloroform, turpentine, carbon disulfide and olive oil; and candelilla wax is soluble in chloroform, turpentine, carbon tetrachloride trichloroethylene, toluene and petroleum ether. Also, paraffin wax or the like can be utilized as an emulsion formed with non-ionic surfactant, such as polyethylene glycol diester.

The amount of wax employed herein may vary somewhat depending upon the particular wax employed and properties desired in the fused film. Generally, however, the wax is present in an amount from about 0.5 to about 8 percent based on weight of total resin solids employed, and having a preferred range of from about 2 to about 5 percent based on weight of total resin solids. Normally, amounts in excess of 8 percent do not appear to be useful as such concentrations tend to give a "cheese-like" quality to the resulting film. It is important to note for the purpose of this invention that it is not necessary to use an amount of wax that would provide for a completely void-free film, it is only desirable that the voids at or near the surface be substantially removed because such voids are so detrimental to the gloss and other properties and it is almost impossible to remove all the voids anyhow.

It is also desirable to employ waxes that are solid at room temperature (70°F.) as in many instances liquid waxes tend to exude or spew forth when the powder is fused.

Incorporation of the wax into the powder coating composition may be accomplished by various techniques.

As mentioned hereinabove the waxes are generally incorporated into the resin before the powder particles are formed. One such method provides for heating a resin solution and adding the wax or adding the wax first and then heating the resin solution to dissolve the wax. Subsequently, the powder is formed by spray-drying techniques. Other techniques that may be employed to manufacture the powdered polymer include dry-mixing, fusion-mixing, agglomerate mixing, pulverizing, and precipitation which are well known in the art, i.e., a solution or dispersion polymer is heated and then sprayed into a heated chamber where the solvent evaporates and the polymer particles precipitate to form the powder. It is also possible to add a solution or an emulsion of the wax to the resin solution and then spray-dry. Likewise, the solid wax may be hot melted along with a batch of resin and subsequently extruded, comminuted and sieved to form the powder by techniques well known in the art.

The resin that may be employed herein may be selected from any of those known in the art such as vinyl resins, epoxy resins, polyester resins, polyethylene resins, polypropylene resins, polyamide resins, chlorinated polyether resins, acrylic resins, fluorocarbon resins and phenolic resins, pulverulent varnishes, celluloses and the like. The particular resin used may vary with desired properties such as electrical insulation, thermal insulation, resilience, abrasion resistance, variable surface friction, chemical corrosion resistance, a non-stick surface, weather resistant edge protection, or the like.

A specific example of a useful crosslinking acrylic copolymer powder is a copolymer made of (a) from 0 to 65 percent by weight of styrene and/or an alkyl and/or halogen substituted styrene; (b) from 10 to 95 percent by weight of one or more esters of acrylic acid or methacrylic acid; (c) from 0.1 to 25 parts by weight of N-hydroxymethylacrylamide or methacrylamide and/or an alkyl ethyl thereof; (d) from 0 to 10 percent by weight of an amide or an alpha, beta-unsaturated carboxylic acid containing from 3 to 5 carbon atoms; and (e) from 0 to 10 percent by weight of an alpha, beta-unsaturated monocarboxylic or dicarboxylic acid containing 2 to 5 carbon atoms.

Suitable group a) monomers include styrene and styrenes substituted by alkyl either at the nucleus or in the side chain. The alkyl groups of the nuclear-substituted styrenes may contain from 1 to 4 carbon atoms, while the alkyl groups in the side chain-substituted styrenes may contain from 1 to 2 carbon atoms. Halogen-substituted styrenes may also be used. Preferred monomers include styrene, p-methyl styrene, p-isopropyl styrene, $\alpha$-methyl styrene, $\alpha$-methyl-p-isopropyl styrene and p-chlorostyrene.

Suitable monomeric carboxylic acid esters of group b) include the monoesters of acrylic and/or methacrylic acid and monohydric or polyhydric alcohols with from 1 to 12 carbon atoms, preferably with from 1 to 8 carbon atoms, such as methyl methacrylate, methyl acrylate, ethyl acrylate, n-butyl acrylate, tert.-butyl acrylate, 2-ethylhexyl acrylate, 2-hydroxypropyl acrylate, 4-hydroxybutyl acrylate and mixtures thereof.

Suitable crosslinking components c) include the N-hydroxymethyl compounds of methacrylamide and/or acrylamide and/or their alkyl ethers with from 1 to 8 carbon atoms and in particular with from 1 to 4 carbon atoms in the ether alkyl moiety, such as N-hydroxymethyl methacrylamide, N-hydroxymethyl acrylamide, N-methoxymethyl acrylamide, N-butoxymethyl acrylamide, N-methoxymethyl methacrylamide and N-butoxymethyl methacrylamide and the corresponding N-alkoxymethyl acrylamides.

Although acrylamide and/or methacrylamide are preferably used as the $\alpha$, $\beta$-unsaturated carboxylic acid amides d), it is also possible to use amides of other ethylenically unsaturated monocarboxylic or dicarboxylic acids, for example, crotonic acid amide, itaconic acid amide, maleic acid diamide, and fumaric acid diamide.

Suitable copolymerizable carboxylic acid of group e) include acrylic acid, methacrylic acid, maleic acid, fumaric acid, itaconic acid and mixtures thereof, preferably acrylic acid, methacrylic acid and maleic acid.

Typical polyester resins that may be utilized herein include oil-modified, oil free, saturated, unsaturated, and imide-modified polyesters. These polyesters have been partially reacted with an amine aldehyde resin to provide a powder having a softening point of at least 65°C. For a more detailed description of this type of powder, see copending U.S. application Ser. No. 221,406 filed Jan. 27, 1972, now U.S. Pat. No. 3,759,854, issued Sept. 18, 1973, which is incorporated by reference herein.

Epoxy resins that are particularly useful for powder application include certain combinations of high molecular weight linear epoxy resins and adducts of trimellitic anhydride with certain polyhydric alcohols. The molecular weight of the epoxy resin should be at least 2000 and suitably in the 3000 to 6000 range, with the comparable epoxy equivalent weight being about 1500 to 3000. The preferred linear resins are the bisphenol A resins obtained by reacting 4,4'-isopropylidenediphenol with epichlorohydrin.

The polyol-trimellitic anhydride adduct contains two acid groups for each hydroxyl group of the alcohol. The adduct of a triol has a functionality of 6, and that of a tetrol has a functionality of 8. Useful polyols include those containing at least 3 hydroxyl groups which have been condensed with a lower alkylene oxide such as ethylene oxide or propylene oxide to provide a molecular weight in excess of 400 and suitably in the 400–1500 range. Polyols containing six or more hydroxyl groups can be employed without the added alkylene oxide. In preparing the adducts the two components are simply mixed together in the proper proportions at 150° to 160°C. for a few minutes, and then cooled and ground. A more detailed description of this type of epoxy powder may be found in U.S. Pat. No. 3,555,111.

Another type of useful powder includes a composition prepared by reacting a polyepoxide with an aliphatic polymeric fatty acid, adding an alkali metal hydroxide in hot aqueous medium with rapid stirring until an emulsion forms and cooling the emulsion to allow the particles to settle out. The polyepoxides may be saturated or unsaturated, aliphatic, cycloaliphatic, aromatic or heterocyclic and may be substituted with substituents, such as chlorine, hydroxyl groups, ether radicals, and the like.

Also, polyepoxide powders prepared from polyhydric phenols and halogen-containing epoxides may be employed. These polyepoxide powders are exemplified in U.S. Pat. No. 2,633,458.

Another group of polyepoxide powders comprises the polyepoxypolyethers obtained by reacting, preferably in the presence of a catalyst compound, such as hydrofluoric acid, or a halogen-containing epoxide, such as epichlorohydrin, with a polyhydric alcohol and then treating the resulting product with an alkaline component.

The fatty acids used include those prepared by dimerizing and trimerizing, monounsaturated and polyunsaturated long chain fatty acids under well-known conditions such as heat, peroxides and the like. The preferred fatty acids contain chains having from 12 to 20 carbon atoms. For a more complete description of this type of polyepoxide powders, see U.S. Pat. No. 3,374,193.

Amide-imide polymeric powders are likewise useful herein.

The amide-imide polymers that are suitable for the present invention include the polymers containing both amide and imide in a repeating unit of

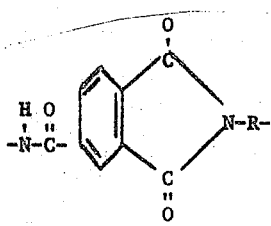

wherein R is a residue of an organic diamine.

The polyamide-imide may be prepared by copolymerization of an acyl halide derivative of trimellitic anhydride (1,2,4-benzene tricarboxylic acid anhydride) and an aromatic primary diamine. The polymeric products derived from repeating unit described above may have the following structure:

(A)
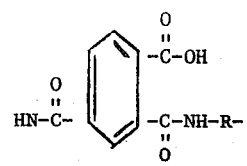

and (B)
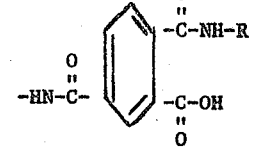

wherein R is the aromatic nucleus of the starting diamine, $H_2NRNH_2$. The linking groups are probably predominantly amido although some may be imido. The polymeric structure may also contain free carboxyl groups which are capable of further reaction. Upon further reaction the above products (A) and (B) form a polymer conforming to the structure of

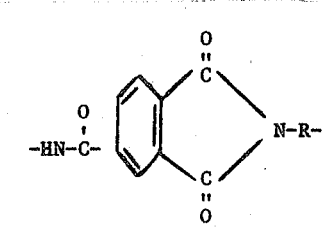

The free carboxyl groups initially present in the polymeric structures are to be substantial extent converted to imide groups by condensation with available amide groups.

The acyl halide derivatives of trimellitic anhydride that are suitable for preparing the aforementioned polyamide-imide polymer have at least one acyl halide group in the 4-ring position. They include, for example, 4-acid chloride, 1,4, and 2,4-diacid chloride (with an ester in the remaining position) and 1,2,4-triacid chloride. The bromides and other reactive halide derivatives are also suitable.

The aromatic diamine that may be used for preparing the polyimide powder preferably have one or more aromatic rings, and two primary amino groups. The aromatic diamines having more than one aromatic ring may be polycyclic aromatic compounds having amino groups of an interconnected polycyclic aromatic nucleus.

Specific examples on how the polyamide-imide polymers are prepared are described in greater detail in Netherlands Patent No. 6,400,422. The polyamide-imide polymers are utilized along with organic anhydrides to form a solid solution, then this solution is mixed with an epoxy resin and cured to form a powder. The preparation of these epoxidized amide-imide polymeric powders are more fully described in U.S. Pat. No. 3,458,595.

Another useful powder includes those powders comprising a mixture of 3 percent to 15 percent by weight of an alkoxylated polyaminealdehyde resin and 85 percent to 97 percent by weight of a polyester resin having an acid number below 20 and a softening point falling within the range between 60°C. and 130°C. of which the acid component comprises a dibasic, aromatic carboxylic acid and of which the alcohol component comprises:

a. from 0 to 100 mole percent (based on the total alcohol component of the polyester) of an alcohol having the general formula:

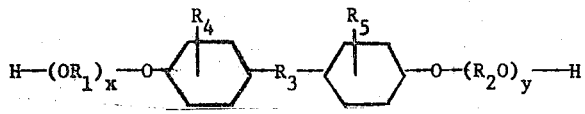

in which $R_1$ and $R_2$ represent alkylene groups having from two to four carbon atoms, $R_3$ represents an alkylidene group having three or four carbon atoms or a cycloalkylidene group having six carbon atoms, or a carbonyl group, or a sulfone group, x and y are numerals each being at least one, the sum of x and y being not greater than six, $R_4$ and $R_5$ represent a hydrogen atom or alkyl radical having from one to six carbon atoms;

b. from 0 to 40 mole percent (based on the total alcohol component of the polyester) of a glycidyl ester having the general formula:

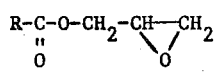

in which R is a straight or branched chain, saturated or unsaturated alkyl group having from four to 20 carbon atoms, or a substituted or unsubstituted benzine nucleus, and c. from 5 to 100 mole percent (based on the total alcohol component of the polyester) of at least one dihydric, aliphatic alcohol, the sum of the alcohol, components (a), (b) and (c) being 100 moles. A more complete description of the embodiments of this type of composition is described in U.S. Pat. No. 3,624,232.

Other useful compositions include powdered coating compositions which comprise a room-temperature-solid epoxy resin that averages more than one 1,2 epoxy group per molecule; a room-temperature-solid, heat-activatable, epoxy-reactive hardener in an amount sufficient to form a crosslinked product with the epoxy, the preferred hardener comprising an aromatic polyamine that includes at least two primary or secondary nitrogen atoms directly attached to an aromatic ring and carrying a combined total of at least three active hydrogen atoms. The composition may also include a catalytic amount of a heat-activatable catalytic accelerator for increasing the rate of the curing reaction comprising a co-catalyst combination of a metal salt of a carboxylic acid and a carboxylic compound. The preferred co-catalyst combination can be selected from three groups:

1. Co-catalyst combinations of (a) tin salts carboxylic acid and (b) carboxylic compounds selected from carboxylic acids and carboxylic acid anhydrides;

2. Co-catalyst combinations of (a) zinc or lead salts of carboxylic acid and (b) carboxylic acid anhydrides; and 3. Co-catalyst combinations of (a) zinc or lead salts of carboxylic acid and (b) aromatic carboxylic acids.

Specific embodiments of these powders are set forth in U.S. Pat. No. 3,506,598.

Coating powders which are produced by comminution of an elastomeric resinous reaction product of a polyfunctional polydiene prepolymer having mainly pendant vinyl groups on alternate carbon atoms of an elongated backbone carbon chain with a polyfunctional chain extender capable of reacting with the functional groups of the polydiene and a peroxide free radical initiator capable of promoting the cyclization of the pendant vinyl groups and the crosslinking of adjacent chains are also useful and may be employed herein.

Examples of these powders are set forth in Canadian Patent No. 858,506.

Likewise, polytetrafluoroethylene powders as described in Canadian Patent No. 885,525; polypropylene powders as described in Canadian Patent No. 883,924; and polyethylene powders as described in Canadian Patent No. 881,141 may readily be employed in the present invention.

In addition to the above-described powder topcoats, all other thermoset and thermoplastic powders which are well known in the art may be employed herein.

In addition to the wide variety of components which may be employed in synthesizing the resins herein, the resin powder particles may be formed by a number of techniques well known in the art. For example, spray-drying; hot-melting and extruding; and solvent precipitation and evaporation techniques.

In addition to containing the waxes and resins described hereinabove, the final powder compositions herein may contain various well-known functional modifiers such as flow agents, crosslinking agents, reactive monomers, solid solvents, plasticizers, surface-active agents, heat stable organic inorganic pigments, inert fillers, inhibitors, abrasives, fungicides, dispersing agents and the like.

Many of the base resin herein may be crosslinked with various agents. Typical crosslinking agents include amino resins, such as aminealdehyde condensation products, for example, aldehyde condensation products of melamine, urea, benzoguanamine, acetoguanamine or similar compounds. Specific examples include alkylated hexamethylol melamines such as hexakis (methoxymethyl) melamine, hexylated methylated methylol melamine and the like. Other crossliinking agents and modifying resins include nitrocellulose resins, hydrocarbon resins, phenolic resins, ester diols, isocyanates, polycaprolactones, vinyl resins acid and/or hydroxyl-containing acrylic resins and the like.

Examples of pigments that may be employed include fillers such as aluminum powder, mica, bentonites, clays, synthetic resins and elastomers, ignited $Al_2O_3$, short-fiber asbestos, wood flours, carbon black silica, zinc dust, talc and the like. Colored pigments include cadmium red, cadmium yellow, phthalocyanine blue, phthalocyanine gree, chrome green, toluidine red, hydrated iron oxide, titanium dioxide and the like.

The powder coating compositions herein may be fused over a wide range of baking schedules, for example, from as low as about 250°F. to about as high as 550°F. or higher, however, generally temperatures in the range of from about 325° to 400°F. are employed herein.

The compositions herein may be applied to a variety of substrates such as zinc, steel, aluminum, copper, tin, asbestos, plastic, hard rubber, wood, glass and the like. Obviously, it is preferred that the temperatures employed to fuse the powder resin be such that they do not adversely affect the selected substrate.

EXAMPLE I

A resin powder coating composition was prepared by grinding with a Cowles blade under high shear agitation the following components:

Control

| | Parts by Weight |
|---|---|
| Polyester power* | 86.00 |
| Flow agent (poly-2-ethylhexyl acrylate) | 1.00 |
| Titanium dioxide | 54.00 |

* A 100 percent solids polyester comprising 67 parts by weight isophthalic acid and 47 parts neopentyl glycol.

After a 6.5 Hegman reading was obtained the following components were added:

| | Parts by Weight |
|---|---|
| p-Toluenesulfonic acid (10% solution in butanol) | 0.05 |
| Hexakis (methoxymethyl) melamine | 14.00 |

After cooling this composition was pulverized, sieved and electrostatically sprayed onto a zinc treated steel panel and then subsequently baked for ten minutes at 400°F. It was observed that the films provided, which had any degree of thickness, displayed a loss in gloss which was primarily due to entrapped voids at or near the surface of the films. This composition was then added to a hot solution of 1330.0 parts toluene and 65.0 parts Castorwax MP-70 (a partially hydrogenated castor oil - having a melting point of 70°C., acid number of 2 and a hydroxyl number of 168.

Upon Cooling the wax-containing resin powder was precipitated, dried and sieved providing for a powder particle of less than about 100 microns in diameter. When this composition was electrostatically applied to a zinc treated steel panel and baked for 10 minutes at 400°F., a film of substantially greater thickness than the control could be formed without a loss of gloss. The improved gloss was due to a significant reduction in the number of entrapped voids present in the films.

EXAMPLE II-VI

These Examples show various levels of wax that may be utilized herein.

| Example | Vehicle | % Castor Wax (on vehicle solids) |
|---|---|---|
| II | Polyester powder (as in Example I) | 6.2 |
| III | do. | 4.6 |
| IV | do. | 3.1 |
| V | do. | 1.5 |
| VI | do. | 0.8 |

When applied and fused in the manner described in Example I, the resulting film surfaces had a substantially reduced level of gas entrapped pockets when compared to the same composition without the wax. The most effective level appears to be that as used in Example III because high levels in some instances give the films provided a cheese-like quality and lesser amounts will provide films which will still have a substantial number of entrapped pockets.

EXAMPLE VII

This composition was prepared in a manner similar to that of Example I.

| | Parts by Weight |
|---|---|
| Polyester powder (below) | 4900.0 |
| Castorwax MP-70 (4.5 percent on vehicles solids) | 141.2 |
| Toluene | 3150.0 |

The composition was then heated until boiling, then strained and precipitated by cooling with dry ice.

Polyester Powder

| | Parts by Weight |
|---|---|
| Polyester resin (as in Example I) | 89.12 |
| Hexakis (methoxymethyl) melamine | 10.88 |
| p-Toluenesulfonic acid (10% solution in butanol) | 0.03 |
| Flow agent (poly-2-ethylhexyl acrylate) | 0.50 |
| Titanium dioxide | 56.00 |

This composition was ground in a conventional sand mill until a Hegman grind gauge reading of 6.5 was obtained. Then this composition was ground by utilizing a high speed Cowles agitator while heating so that a partial reaction took place. After cooling the solid composition provided was comminuted and sieved to provide powder particles having a suitable size.

EXAMPLE VIII

Initially, a powder solution composition was prepared as utilized in Example I and was comprised of the following components:

| | Parts by Weight |
|---|---|
| Polyester powder (as in Example I) | 274.5 |
| Titanium dioxide | 175.0 |
| Hexakis (methoxymethyl melamine) | 30.5 |
| Flow agent (poly-2-ethylhexyl acrylate) | 6.50 |
| Wax (methyl-12-hydroxy stearate) | 17.50 |
| p-Toluenesulfonic acid | 0.10 |
| Toluene | 335.00 |

A wax-containing composition was prepared by adding 6.0 parts of carnauba wax to 200 parts of the heated solution above. Subsequently, a powder was prepared by precipitation of the composition by cooling with dry ice.

The film prepared from the application and fusing this powder showed a substantial improvement in appearance as compared to the same film prepared without the wax additive.

EXAMPLE IX

This is an example of a wax-containing powder coatings composition comprising an epoxide resin in addition to a polyester powder.

| | Parts by Weight |
|---|---|
| Polyester powder* | 54.0 |
| Reaction product of epichlorohydrin and Bisphenol A (Epon 828) | 9.6 |
| Flow agent (as in Example I) | 0.5 |
| Titanium dioxide | 34.0 |
| Wax (oxidized homopolymer of polyethylene- | |

-Continued

| | Parts by Weight |
|---|---|
| Allied Chemical's AC-629) | 2.0 |

* Comprises a mixture of 90 percent of the polyester resin of Example I and 10 percent trimellitic anhydride.

Films provided by this Example which were prepared in the same manner as described above were compared to a control system that was devoid of any wax additive but otherwise the same. The control displayed poor glass, poor appearance, very poor flow and a substantial number of gas bubbles were visible whereas, the wax-containing system showed excellent gloss, excellent appearance and no bubbles or gas entrapped pockets were visible at the surface.

In addition to the resin powders employed herein, other powders such as polyepoxides which have been reacted with an aliphatic polymeric fatty acid, amide-imide polymeric powder; alkoxylated polyamine-aldehyde resin powder, polypropylene powder, polyethylene and the like may be utilized. Also other suitable waxes include beeswax, paraffin wax, palm wax, and the like. Other useful crosslinking agents to modify thermosetting resins, include hexylated methylated methylol melamine, nitrocellulose resins, phenolic resins, and the like. Likewise, the pigmentation color and quantity may be varied depending on the desired properties.

According to the provisions of the Patent Statutes, there are described above the invention and what are now considered to be its best embodiments. However, within the scope of the appended claims, it is to be understood that the invention can be practiced otherwise than as specifically described.

We claim:
1. A method of providing a substantially void-free film surface from a resin powder coating composition which comprises the steps of:
   a. incorporating from about 2 percent to about 5 percent by weight of resin solids of a natural or synthetic wax in said resin powder coating composition, wherein said resin powder coating composition comprises a resin powder selected from the group consisting of crosslinking acrylic copolymers, polyesters, polyepoxides and amide-imine polymers;
   b. applying said wax-containing resin powder coating composition to a substrate; and
   c. fusing said wax-containing resin powder composition thereby producing a substantially void-free film surface.

2. A method as in claim 1 wherein the wax is selected from the group consisting of castor wax, methyl-12-hydroxy stearate and an oxidized homopolymer of polyethylene.

3. A method as in claim 1 wherein the wax-containing resin powder coating composition is electrostatically applied to a metal substrate.

4. A method as in claim 1 wherein the composition is a reaction product of:
   a. polyester resin; and
   b. an amine aldehyde resin.

5. A method as in claim 4 wherein said reaction product is pigmented.

6. A method as in claim 4, wherein said reaction product comprises from about 5 to about 20 percent by weight of a amine aldehyde resin.

7. A method as in claim 5 wherein said polyester resin is a member of the class consisting of polyesters, oil-modified polyesters, and imide modified polyesters.

8. A method as in claim 4 wherein said amine-aldehyde resin is an aldehyde condensation product of melamine, urea or benzoguanamine.

9. A coating composition comprising a resin powder which is a reaction product of:
   a. a polyester resin; and
   b. an amine-aldehyde resin; said resin powder having incorporated therein from about 2 percent to about 5 percent by weight, based on resin solids, of a natural or synthetic wax.

10. A coating as in claim 9 wherein said reaction product is pigmented.

11. A coating as in claim 9 wherein said reaction product comprises from about 5 to about 20 percent by weight of a amine aldehyde resin.

12. A coating as in claim 11 wherein said polyester resin is a member of the class consisting of polyesters, oil-modified polyesters, and imide modified oil-free polyesters.

13. A coating as in claim 9 wherein said amine-aldehyde resin is an aldehyde condensation product of melamine, urea or benzoguanamine.

14. A coating as in claim 9 wherein the wax is selected from the group consisting of castor wax, methyl-12-hydroxy stearate and an oxidized homopolymer of polyethylene.

15. An article of manufacture having a fused film thereon, said film formed by fusing the composition of claim 9.

* * * * *